(12) United States Patent
Admuthe et al.

(10) Patent No.: US 10,086,466 B2
(45) Date of Patent: Oct. 2, 2018

(54) MULTIVOLTAGE WELDING APPARATUS

(71) Applicant: ESAB AB, Gothenburg (SE)

(72) Inventors: Vaijnath Bhimrao Admuthe, Mumbai (IN); Lars Gerdin, Kumla (SE); Pimple Vinay Vilas, Palghar (IN); Pisal Kiran Uttam, Mumbai (IN); Dave Homeshkumar Bhanushanker, Ahmedabad (IN)

(73) Assignee: ESAB AB (SE)

( * ) Notice: Subject to any disclaimer, the term of this patent is extended or adjusted under 35 U.S.C. 154(b) by 17 days.

(21) Appl. No.: 15/584,540

(22) Filed: May 2, 2017

(65) Prior Publication Data

US 2017/0232544 A1    Aug. 17, 2017

Related U.S. Application Data

(63) Continuation of application No. PCT/IB2015/058563, filed on Nov. 5, 2015.

(30) Foreign Application Priority Data

Nov. 10, 2014  (IN) .......................... 3528/MUM/2014

(51) Int. Cl.
  *B23K 9/10*  (2006.01)
  *H02M 3/335*  (2006.01)
  (Continued)

(52) U.S. Cl.
  CPC ............ *B23K 9/1043* (2013.01); *B23K 9/124* (2013.01); *H01F 27/006* (2013.01);
  (Continued)

(58) Field of Classification Search
  CPC ..... B23K 9/1043; B23K 9/124; H01F 27/306; H01F 27/006; H02M 3/3376;
  (Continued)

(56) References Cited

U.S. PATENT DOCUMENTS

| 4,646,217 A * | 2/1987 | Baroni .............. H02M 3/33561 363/17 |
| 5,601,741 A * | 2/1997 | Thommes ................ B23H 7/08 219/130.21 |
| 6,278,080 B1 | 8/2001 | Moriguchi et al. |

(Continued)

FOREIGN PATENT DOCUMENTS

EP    1704954 A1    9/2006

OTHER PUBLICATIONS

Received STIC search report from EIC 2800 searcher Benjamin Martin on Sep. 19, 2017.*

(Continued)

*Primary Examiner* — Timothy J Dole
*Assistant Examiner* — Htet Z Kyaw
(74) *Attorney, Agent, or Firm* — Edell, Shapiro & Finnan, LLC

(57) ABSTRACT

An apparatus may include an input circuit to receive an AC input voltage having a first magnitude within a range of AC input voltages, and generate a first DC voltage; a boost converter to receive the first DC voltage and output a second DC voltage having a fixed magnitude that is not dependent upon the first magnitude of the AC input voltage; an output circuit to receive the second DC voltage and convert the second DC voltage into welding type power; a control DC-DC converter to receive the first DC voltage and output a control power signal as a third DC voltage; a boost converter control component to receive the control power signal and generate a control signal to control operation of the boost converter; and an auxiliary AC power source to receive the second DC voltage output by the boost converter and to generate an AC auxiliary output voltage.

14 Claims, 3 Drawing Sheets

(51) Int. Cl.
    *H01F 27/00*     (2006.01)
    *H02M 3/337*     (2006.01)
    *H01F 27/30*     (2006.01)
    *B23K 9/12*     (2006.01)

(52) U.S. Cl.
    CPC ........ *H01F 27/306* (2013.01); *H02M 3/3376* (2013.01); *H02M 3/33592* (2013.01)

(58) Field of Classification Search
    CPC ............ H02M 3/33592; H02M 7/537; H02M 7/5387; H01L 2924/00014; Y02B 70/1491
    USPC ................ 363/17, 16, 98, 131, 132
    See application file for complete search history.

(56) References Cited

U.S. PATENT DOCUMENTS

| | | | | |
|---|---|---|---|---|
| 6,295,216 | B1* | 9/2001 | Faria | H02M 1/12 |
| | | | | 307/105 |
| 6,329,636 | B1* | 12/2001 | Geissler | B23K 9/1006 |
| | | | | 219/130.1 |
| 6,849,827 | B2* | 2/2005 | Thommes | B23H 7/08 |
| | | | | 219/130.21 |
| 8,581,147 | B2* | 11/2013 | Kooken | B23K 9/095 |
| | | | | 219/130.1 |
| 9,219,378 | B2* | 12/2015 | Mudrick | H02J 7/025 |
| 2006/0175313 | A1* | 8/2006 | Kooken | B23K 9/09 |
| | | | | 219/130.1 |
| 2006/0213890 | A1* | 9/2006 | Kooken | B23K 9/095 |
| | | | | 219/130.21 |
| 2007/0051712 | A1* | 3/2007 | Kooken | B23K 9/095 |
| | | | | 219/130.1 |
| 2010/0006551 | A1* | 1/2010 | Geissler | B23K 9/1018 |
| | | | | 219/130.1 |
| 2010/0309697 | A1* | 12/2010 | Werle | H02M 1/4208 |
| | | | | 363/126 |
| 2011/0011842 | A1* | 1/2011 | Thomas | B23K 9/1043 |
| | | | | 219/130.21 |
| 2011/0049115 | A1* | 3/2011 | Luo | B23K 9/1056 |
| | | | | 219/130.21 |
| 2014/0374397 | A1* | 12/2014 | Vogel | B23K 9/1043 |
| | | | | 219/130.1 |
| 2015/0060426 | A1* | 3/2015 | Schartner | B23K 9/173 |
| | | | | 219/130.21 |

OTHER PUBLICATIONS

International Search Report and Written Opinion in corresponding International Patent Application No. PCT/IB2015/058563, dated Feb. 2, 2016.

\* cited by examiner

- GENERATING A FIRST DC VOLTAGE BASED UPON AN AC INPUT VOLTAGE THAT HAS A FIRST MAGNITUDE
  302

- RECEIVING THE FIRST DC VOLTAGE IN A BOOST CONVERTER AND OUTPUTTING A SECOND DC VOLTAGE HAVING A FIXED MAGNITUDE THAT IS NOT DEPENDENT UPON THE FIRST MAGNITUDE OF THE AC INPUT VOLTAGE
  304

- CONVERTING THE SECOND DC VOLTAGE INTO WELDING TYPE POWER
  306

- RECEIVING THE FIRST DC VOLTAGE AND OUTPUTTING A CONTROL POWER SIGNAL AS A THIRD DC VOLTAGE
  308

- RECEIVING THE CONTROL POWER SIGNAL AND GENERATING A CONTROL SIGNAL TO CONTROL OPERATION OF THE BOOST CONVERTER
  310

- RECEIVING THE SECOND DC VOLTAGE AND GENERATING AN AC AUXILIARY OUTPUT VOLTAGE
  312

MULTIVOLTAGE WELDING APPARATUS

CROSS REFERENCE TO RELATED APPLICATIONS

This application is a continuation of International Application No. PCT/IB2015/058563, filed on Nov. 5, 2015, which claims priority under 35 U.S.C. § 119 to Indian Application No. 3528/MUM/2014 filed on Nov. 10, 2014, the entire contents of both of which are hereby incorporated by reference.

TECHNICAL FIELD

The present embodiments are related to power supplies for welding type power, that is, power generally used for welding, cutting, or heating.

BACKGROUND

Welding apparatus that are used to generate welding type power are often designed to accommodate different input voltages, which may result from different alternating current (AC) input voltage that may be supplied to the power supply depending upon location. In some designs, an AC power input may be rectified to generate a rectified input voltage, which may be converted to a constant DC output voltage. Depending upon the magnitude of the input voltage, in different known power supply designs, the constant DC output voltage may be boosted (increased) or bucked (decreased) with respect to the rectified input voltage.

The constant DC output voltage, which may have a value in the range of 400 V to 800 V is some designs, may be converted into welding type power using, for example, a main inverter and main transformer that reduces the constant DC output voltage to a suitable level for welding type power.

In order to supply power to other components of a welding apparatus, it may be appropriate to draw power from different sources. In some known designs a boost converter that generates power at a constant DC voltage for welding, may also be configured to distribute the constant DC voltage ("boost voltage") to other components for controlling operation of circuitry in the welding apparatus. In other designs, AC voltage from an AC mains may be harnessed to supply power to control circuitry of a welding apparatus. A given architecture for supplying welding power as well as power to other components of a welding apparatus may have advantages and disadvantages with respect to cost, stability, flexibility, and complexity. It is with respect to these and other considerations that the present disclosure is provided.

SUMMARY

In one embodiment, an apparatus to provide welding type power may include: an input circuit to receive an AC input voltage having a first magnitude within a range of AC input voltages, and to generate a first DC voltage; a boost converter configured to receive the first DC voltage and output a second DC voltage having a fixed magnitude that is not dependent upon the first magnitude of the AC input voltage; an output circuit configured to receive the second DC voltage and convert the second DC voltage into welding type power; a control DC-DC converter configured to receive the first DC voltage and output a control power signal as a third DC voltage; a boost converter control component to receive the control power signal and generate a control signal to control operation of the boost converter; and an auxiliary AC power source to receive the second DC voltage output by the boost converter and to generate an AC auxiliary output voltage.

In another embodiment, a method may include generating a first DC voltage based upon an AC input voltage that has a first magnitude; receiving the first DC voltage in a boost converter and outputting a second DC voltage having a fixed magnitude that is not dependent upon the first magnitude of the AC input voltage; converting the second DC voltage into welding type power; receiving the first DC voltage and outputting a control power signal as a third DC voltage; receiving the control power signal and generating a control signal to control operation of the boost converter; and receiving the second DC voltage and generating an AC auxiliary output voltage.

DESCRIPTION OF FIGURES

FIG. 3 depicts an exemplary process flow.

DESCRIPTION OF EMBODIMENTS

The present embodiments provide improvements over conventional apparatus used to provide welding type power, which may be referred to herein as "welding apparatus." In the description to follow various entities may be referred to generally as AC voltage, DC voltage, DC signal, AC signal. A signal output by a given same component may be referred to, for example, as a "DC1 signal" while the voltage of the "DC1 signal" is referred to as a "DC1" voltage. It will be understood that a term such as "DC1" may refer to a DC1 signal or voltage of the DC1 signal, that is, the DC1 voltage.

A welding apparatus of the present embodiments may include an input circuit to receive an AC input voltage having a first magnitude within a range of AC input voltages. The input circuit may include one or more conventional components such as input rectifiers, filters, and so forth. The input circuit may output a first DC voltage, where the magnitude of the first DC voltage may be dependent upon the magnitude of the AC input voltage. The welding apparatus of the present embodiments may also include a boost converter configured to receive the first DC voltage and output a second DC voltage having a fixed magnitude that is not dependent upon the magnitude of the AC input voltage. The welding apparatus may further include an output circuit configured to receive the second DC voltage and convert the second DC voltage into welding type power. The output circuit may include generally known components such as a primary inverter, main transformer, and output rectifier, which together may generate a welding type output based upon the received second DC voltage. The welding apparatus of the present embodiments may also include a control DC-DC converter configured to receive the first DC voltage and output a control power signal. In addition, the welding apparatus may include a boost converter control component to receive the control power signal and generate a control signal to control operation of the boost converter. The welding apparatus may also include an auxiliary converter to receive the second DC voltage output by the boost converter and to generate an AC auxiliary output voltage.

In particular embodiments the welding apparatus may include in addition to the aforementioned features, an auxiliary transformer configured to receive the AC auxiliary output voltage from the auxiliary converter, and to output power to auxiliary components.

Figure 1:
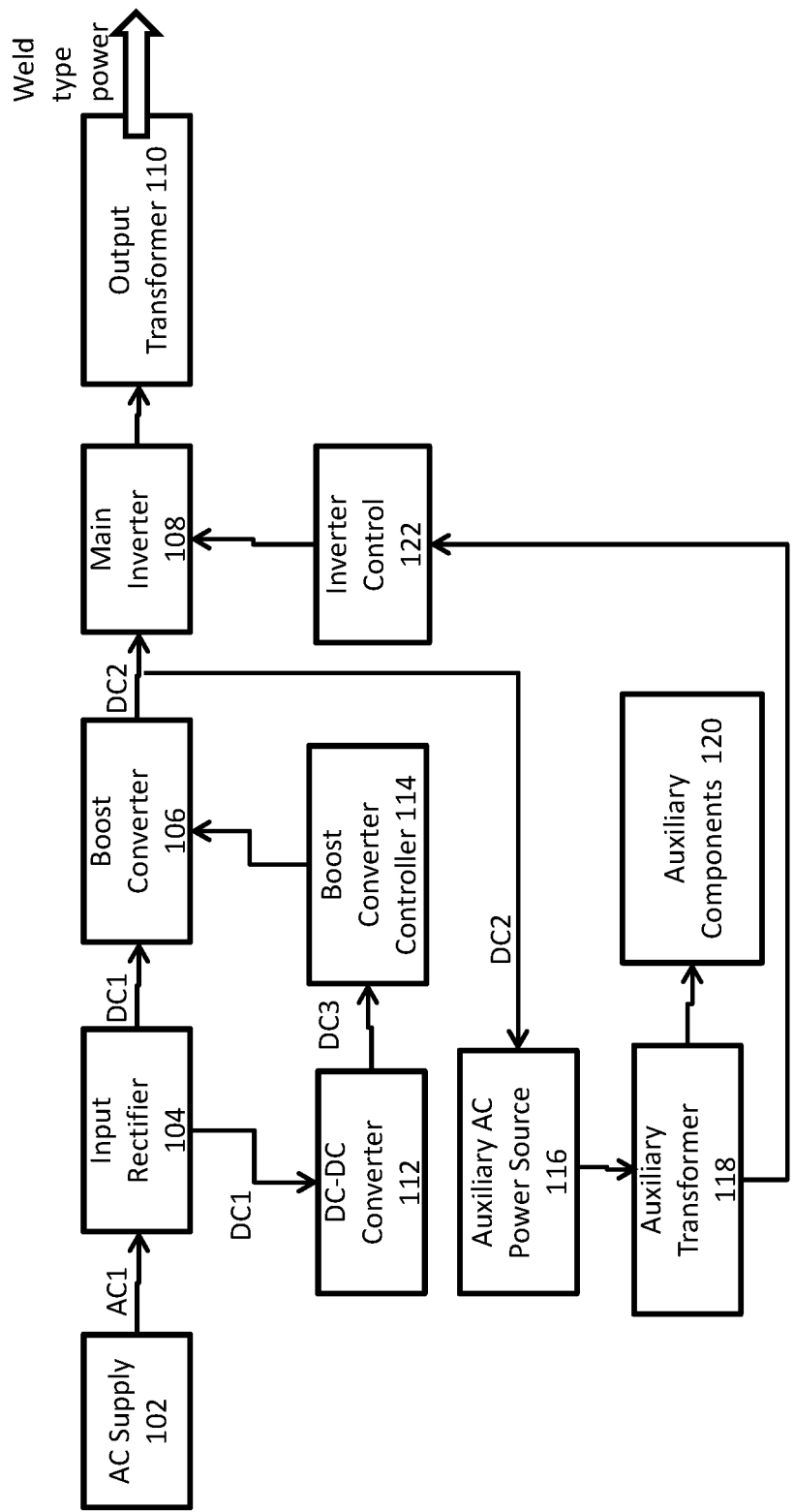
FIG. 1 depicts a block diagram of an exemplary apparatus.

FIG. 1 shows an apparatus 100 that may be used to generate welding type power, according to embodiments of the disclosure. The apparatus 100 is configured to receive power from an AC supply 102, which may represent AC mains that provide AC power at 50 Hz or 60 Hz in some embodiments. The apparatus 100 may be configured to operate using different AC input voltages over a wide range of voltages in some embodiments, such as between 90 V and 460 V.

The apparatus 100 may include various input circuitry to convert the incoming AC power received from AC supply 102 into a direct current (DC) signal. The input circuitry may include known components such as filters, rectifiers, and pre-charge circuitry. In the example of FIG. 1, an input rectifier 104 is shown, which receives an AC signal AC1 and outputs a DC signal DC1. The magnitude of DC1 voltage may depend upon the magnitude of the AC1 voltage. The apparatus 100 also includes a boost converter 106 that is configured to receive the DC1 signal and generate a DC2 voltage that is increased above the voltage of the DC1 signal. In some examples, the DC2 signal may have a magnitude of 700 V to 800V. The embodiments are not limited in this context.

The DC2 signal may be provided to an output circuit having known components in order to generate welding power. For example, the DC2 signal may be received by a main inverter 108, which outputs AC power to the output transformer 110. The output transformer 110 generates welding type power, which may operate at a much lower voltage than the DC2 signal. In other embodiments other known converters may be used in an output circuit.

The apparatus 100 includes a control DC-DC converter, shown as a DC-DC converter 112 that is configured to receive the DC1 signal from the input rectifier 104. The DC-DC converter 112 may be a flyback converter or other converter that outputs power as a third DC voltage, shown as the DC-3 signal, to a boost converter controller 114. In some examples, the voltage of power sent from the DC-DC converter 112 to the boost converter controller 114 may be less than 100 V, and in particular examples, less than 50 V. The boost converter controller 114, in turn, controls operation of the boost converter, such as by controlling a switch to determine boost voltage output as the DC2 voltage.

The apparatus 100 also includes an auxiliary AC power source 116 that is configured to receive the DC2 voltage. The auxiliary AC power source 116 may be configured to output AC power using an auxiliary converter such as an inverter. The auxiliary AC power source 116 may be configured to supply auxiliary power (aux power) to operate various components of the apparatus 100, shown as the auxiliary components 120. The auxiliary components 120 may include external cooling units, fans, various other tools, valves, a welding wire feeder, torch, and other components that receive auxiliary power form the auxiliary AC power source 116. The auxiliary AC power source 116 is coupled to an auxiliary transformer 118, which may reduce the voltage of the AC power received from the auxiliary AC power source. A lower voltage signal may then be transmitted to the auxiliary components 120 for operation.

The apparatus 100 further includes an inverter control component 122 that receives auxiliary power output from the auxiliary transformer 118. The inverter control component 122 may regulate operation of the main inverter 108.

An advantage provided by the architecture of the apparatus 100 is that auxiliary power to operate the auxiliary components 120 may be conveniently provided by using an inverter to harness the DC2 signal, which may ensure stable operation. At the same time, DC1 voltage may be harnessed by the DC-DC converter 112, which may not require the DC2 signal to provide stable control power for operating the boost converter controller 114.

Figure 2:
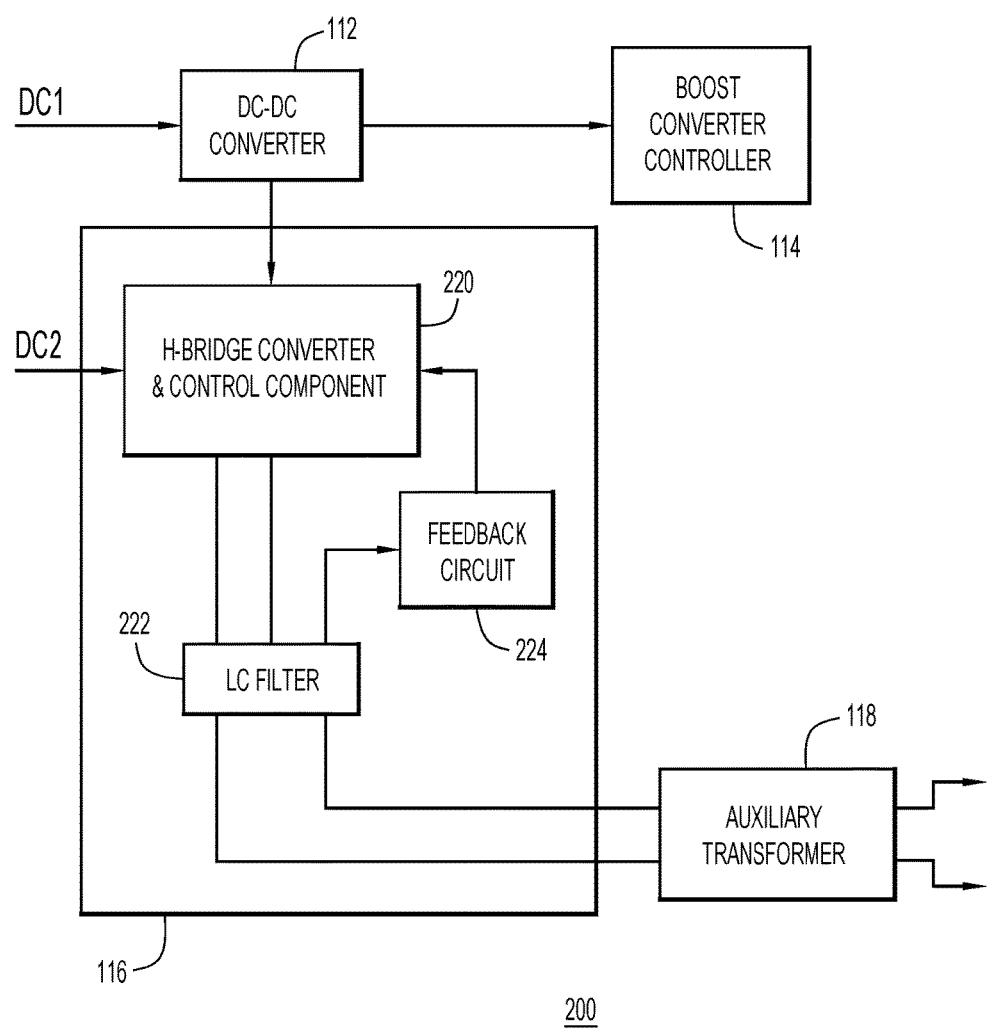
FIG. 2 depicts a schematic diagram of another exemplary apparatus.

FIG. 2 illustrates an arrangement 200 according to further embodiments. The arrangement 200 may form part of the apparatus 100 in various embodiments. In particular the arrangement 200 depicts a variant of the auxiliary AC power source 116. In this embodiment, the auxiliary AC power source 116 includes an auxiliary converter shown as an H-bridge converter (inverter) and control component 220 that is configured to receive the DC2 signal that is output by the boost converter 208. The H-bridge converter and control component 220 may generate an AC signal from the received DC2 signal according to known procedures for H-bridge inverters. The AC signal generated by the H-bridge converter and control component 220 may be filtered by an LC filter 222 to provide a filtered signal output to the auxiliary transformer 118. The auxiliary transformer 118 may supply power to various components of an apparatus such as the apparatus 100. The auxiliary AC power source 116 may also include a voltage and current feedback circuit 224 coupled between the LC filter 222 and H-bridge converter and control component 220. As further shown in FIG. 2, the DC-DC converter 112, in addition to supplying power to the boost converter controller 114, may supply power to control circuitry in the H bridge converter and control component 220.

Turning now to FIG. 3 there is shown an exemplary flow 300. At block 302 the operation is performed of generating a first DC voltage based upon an AC input voltage that has a first magnitude. At block 304 the first DC voltage is received in a boost converter and outputting a second DC voltage having a fixed magnitude that is not dependent upon the first magnitude of the AC input voltage. At block 306 the second DC voltage is converted into welding type power. At block 308 the first DC voltage is received and a control power signal is output as a third DC voltage. At block 310, the control power signal is received and a control signal is generated to control operation of the boost converter. At block 312 the second DC voltage is received and an AC auxiliary output voltage is generated.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Thus, the claims set forth below are not to be construed in view of the full breadth and spirit of the present disclosure as described herein.

What is claimed is:

1. An apparatus to provide welding type power, comprising:
    an input circuit to receive an AC input voltage having a first magnitude within a range of AC input voltages, and to generate a first DC voltage;
    a boost converter configured to receive the first DC voltage and output a second DC voltage having a fixed magnitude that is not dependent upon the first magnitude of the AC input voltage;

an output circuit configured to receive the second DC voltage and convert the second DC voltage into welding type power;
a control DC-DC converter configured to receive the first DC voltage and output a control power signal as a third DC voltage;
a boost converter control component configured to receive the control power signal and generate a control signal to control operation of the boost converter; and
an auxiliary AC power source configured to receive the second DC voltage from the boost converter and to generate an AC auxiliary output voltage.

2. The apparatus of claim 1, wherein the output circuit comprises a primary inverter to convert the second DC voltage into AC power having a first AC voltage, and a main transformer configured to receive the first AC voltage and output a second AC voltage less than the first AC voltage.

3. The apparatus of claim 1, further comprising:
an auxiliary transformer configured to receive the AC auxiliary output voltage from the auxiliary AC power source, and output power to auxiliary components.

4. The apparatus of claim 1, wherein the auxiliary AC power source comprises:
an H-bridge converter and control component that is configured to receive the second DC voltage and generate the AC auxiliary output voltage.

5. The apparatus of claim 4, the auxiliary AC power source further comprising an LC filter to receive the AC auxiliary output voltage and output a filtered signal to an auxiliary transformer.

6. The apparatus of claim 5, wherein the auxiliary AC power source further comprises a voltage and current feedback circuit coupled between the LC filter and H-bridge converter and control component.

7. The apparatus of claim 4, wherein the control DC-DC converter is coupled to the H-bridge converter and control component to supply power to control circuitry in the H bridge converter and control component.

8. A method, comprising:
generating a first DC voltage based upon an AC input voltage that has a first magnitude;
receiving the first DC voltage in a boost converter and outputting a second DC voltage having a fixed magnitude that is not dependent upon the first magnitude of the AC input voltage;
converting the second DC voltage into welding type power;
receiving the first DC voltage and outputting a control power signal as a third DC voltage;
receiving the control power signal and generating a control signal to control operation of the boost converter; and
receiving the second DC voltage and generating an AC auxiliary output voltage.

9. The method of claim 8, wherein the first magnitude lies within a range of AC input voltages.

10. The method of claim 8, wherein the converting the second DC voltage into the welding type power comprises converting the second DC voltage into AC power having a first AC voltage, receiving the first AC voltage in a main transformer, and outputting a second AC voltage less than the first AC voltage.

11. The method of claim 8, further comprising: receiving the AC auxiliary output voltage in an auxiliary transformer and outputting power to auxiliary components.

12. The method of claim 8, wherein generating the AC auxiliary output voltage comprises converting the second DC voltage to the AC auxiliary output voltage using an H-bridge converter.

13. The method of claim 12, further comprising receiving the AC auxiliary output voltage and outputting a filtered signal to an auxiliary transformer.

14. The method of claim 12, wherein the third DC voltage is output by a DC-DC converter, the method further comprising supplying power from the DC-DC converter to a controller of the H-bridge converter.

* * * * *